(12) United States Patent
Heuer et al.

(10) Patent No.: US 8,788,483 B2
(45) Date of Patent: Jul. 22, 2014

(54) METHOD AND APPARATUS FOR SEARCHING IN A MEMORY-EFFICIENT MANNER FOR AT LEAST ONE QUERY DATA ELEMENT

(75) Inventors: Jörg Heuer, Oberhaching (DE); Roland Kind, Potsdam (DE); Richard Kuntschke, Geisenhausen (DE); Daniel Peintner, Mühlbach (IT)

(73) Assignee: Siemens Aktiengesellschaft, Munich (DE)

( * ) Notice: Subject to any disclaimer, the term of this patent is extended or adjusted under 35 U.S.C. 154(b) by 362 days.

(21) Appl. No.: 12/819,280

(22) Filed: Jun. 21, 2010

(65) Prior Publication Data

US 2010/0325151 A1     Dec. 23, 2010

(30) Foreign Application Priority Data

Jun. 19, 2009   (EP) .................................. 09008060
Aug. 7, 2009    (EP) .................................. 09010241

(51) Int. Cl.
*G06F 17/30* (2006.01)

(52) U.S. Cl.
USPC ............ 707/717; 707/718; 707/759; 707/769

(58) Field of Classification Search
None
See application file for complete search history.

(56) References Cited

U.S. PATENT DOCUMENTS

| | | | |
|---|---|---|---|
| 2003/0212664 A1 | 11/2003 | Breining et al. | 707/3 |
| 2005/0010606 A1* | 1/2005 | Kaiser et al. | 707/200 |
| 2005/0044073 A1* | 2/2005 | Inokuchi | 707/3 |
| 2006/0085394 A1* | 4/2006 | Barsness et al. | 707/3 |
| 2007/0150469 A1* | 6/2007 | Simonyi | 707/6 |
| 2007/0156751 A1* | 7/2007 | Goetz et al. | 707/103 R |
| 2008/0010296 A1* | 1/2008 | Bayliss et al. | 707/10 |
| 2008/0114721 A1* | 5/2008 | Jones et al. | 707/2 |
| 2008/0154893 A1 | 6/2008 | Ting et al. | 707/6 |
| 2009/0055368 A1* | 2/2009 | Rewari et al. | 707/4 |
| 2009/0228437 A1* | 9/2009 | Narayanan et al. | 707/3 |
| 2009/0254916 A1* | 10/2009 | Bose et al. | 718/104 |
| 2010/0161643 A1* | 6/2010 | Gionis et al. | 707/765 |

FOREIGN PATENT DOCUMENTS

| | | | |
|---|---|---|---|
| EP | 0408188 | 1/1991 | G06F 15/419 |
| EP | 1052576 | 1/2005 | G06F 17/30 |
| EP | 1808987 | 7/2007 | H04L 12/56 |
| WO | 2005008521 | 1/2005 | G06F 17/30 |

OTHER PUBLICATIONS

Clark et al. "XML Path Language (XPath) Version 1.0", W3C Recommendation Nov. 16, 1999 (31 pages).
Ferraiolo et al. "Scalable Vector Graphics (SVG) 1.1 Specification", W3C Recommendation Jan. 14, 2003 http://www.w3.org/TR/2003/REC-SVG11-20030114.pdf (719 pages).

(Continued)

*Primary Examiner* — Mohammad S Rostami

(74) *Attorney, Agent, or Firm* — King & Spalding L.L.P.

(57) ABSTRACT

In a method and an apparatus (1) for searching in a memory-efficient manner for at least one query data element in a graph (2A), only as many data elements are read into a memory as are required for their subsequent processing. Increased memory efficiency is ensured as a result of this. The proposed apparatus is particularly suitable for use in terminals having very limited memory, in particular in mobile terminals.

20 Claims, 4 Drawing Sheets

(56) References Cited

OTHER PUBLICATIONS

Cimprich et al. "Streaming Transformations for XML (STX) Version 1.0", Working Draft Apr. 27, 2007 http://stx.sourceforge.net/documents/spec-stx-20070427.html (59 pages).

Altinel et al. "Efficient Filtering of XML Documents for Selective Dissemination of Information", Proceedings of the 26$^{th}$ VLDB Conference (12 pages), 2000.

Diao et al. "High-Performance XML Filtering: An Overview of YFilter", IEEE Data Engineering Bulletin 26:41-48 (8 pages), 2003.

Hors et al. "Document Object Model (DOM) Level 3 Core Specification Version 1.0" W3C Recommendation Apr. 7, 2004 http://www/w3.org/TR/2004/REC-DOM-Level-3-Core-20040407 (106 pages).

Marian et al. "Projecting XML Documents", Proceedings of the 29$^{th}$ VLDB Conference (12 pages), 2003.

Schneider et al. "Efficient XML Interchange (EXI) Format 1.0" W3C Working Draft Jul. 28, 2008 http://www.w3.org/TR/2008/WD-exi-20080728 (110 pages), May 8, 2009.

* cited by examiner

METHOD AND APPARATUS FOR SEARCHING IN A MEMORY-EFFICIENT MANNER FOR AT LEAST ONE QUERY DATA ELEMENT

CROSS-REFERENCE TO RELATED APPLICATIONS

This application claims priority to EP Patent Application No. 09008060 filed Jun. 19, 2009 and EP Patent Application No. 09010241 filed Aug. 7, 2009. The contents of which is incorporated herein by reference in its entirety.

TECHNICAL FIELD

The present invention provides a method for searching for data elements on resource-limited terminals and, in particular, a method for searching in a memory-efficient manner for at least one query data element in a graph. Furthermore, the present invention provides a corresponding apparatus for searching in a memory-efficient manner for at least one query data element in a graph. Furthermore, the present invention provides a computer program product which initiates the implementation of the aforementioned method, and a data memory for storing the computer program product.

BACKGROUND

As a result of continuous development, control and configuration algorithms are becoming very extensive and complex. Consequently, electronic devices and in particular mobile terminals must offer extensive resources to process said algorithms. In conventional methods, mobile terminals are therefore equipped with large data memories. This typically signifies greater expense with regard to the incorporation of device resources into the electronic device, since these device resources have an increased space requirement. Therefore the memory requirement in e.g. conventional methods can no longer be satisfied by a single memory element, and a multiplicity of memory elements must be provided instead, both for storing the control and configuration data and for processing the control and configuration algorithms.

High-speed processors are typically required for processing the extensive data records. These high-speed processors produce more heat, and therefore passive or active cooling elements are required when executing conventional methods. High-speed processors and a multiplicity of data memories result in an increased energy requirement of the electronic device. This results in shortened usability, particularly in the case of mobile terminals, since energy stores only allow a very limited operating period of the multiplicity of device resources.

In both mobile and stationary application scenarios in which searching for query data elements takes place, a plurality of computer systems interact via a radio interface. For example, a server provides a query data element to a client, wherein the search for the query element is implemented on the client on the basis of a data record. The provision of the query data element and a consequential provision of return parameters take place by means of a radio interface, for example. This results in a significant volume of data, which must be transmitted via e.g. a WLAN network. In this case, there is a possibility of data loss and/or unauthorized monitoring of the data that is transmitted. Furthermore, provision must be made for efficient network devices and large data memories.

In order to optimize a memory requirement, compression algorithms are used in conventional methods. In this case, the intention is to reduce memory requirement by encoding the data records in a suitable manner. These compression algorithms can incur data losses or result in zero losses depending on the application scenario. If an encoding does incur losses, a data loss up to a specific degree is accepted if this data loss appears to be justified by a reduced memory requirement. The data records are compressed on the sender side and decompressed on the receiver side. System resources for processing the compression or decompression algorithms are required in each case for this purpose.

Format-specific encoding specifications, which use e.g. a binary encoding for XML documents, are also known from conventional methods. The Efficient XML Interchange format (EXI) is one such example.

In conventional methods, the processing of extensive configuration and control algorithms gives rise to a greater resource requirement and hence implicitly to a greater energy requirement and delayed response times, in particular as a result of processing compression algorithms and decompression algorithms. In addition, data records that are provided in this context are typically accessed more frequently than is necessary for the purpose of searching efficiently for a query data element.

SUMMARY

According to various embodiments, an improved method and/or an improved apparatus for searching in a memory-efficient manner for at least one query data element in a graph can be provided.

According to an embodiment, a method for searching in a memory-efficient manner for at least one query data element in a graph, in particular for use in a mobile terminal, may comprising: —segmenting the query data element into at least one query data segment; —iteratively executing the following subsidiary steps for identifying the at least one query data segment in the graph: a) comparing a subordinate data element with a query data segment, wherein the subordinate data element is connected to a superordinate data element by means of exactly one edge in the graph; and b) storing the subordinate data element as a superordinate data element, if the subordinate data element features at least one query data segment; and—providing the stored superordinate data element, if at least one query data segment is identified in the graph.

According to a further embodiment, the storage of the subordinate data element as a superordinate data element may be executed in such a way that a previously stored superordinate data element is overwritten by the subordinate data element. According to a further embodiment, the storage of the subordinate data element as a superordinate data element can be executed in such a way that a previously stored superordinate data element is deleted from a memory and the subordinate data element is written into the memory. According to a further embodiment, the query data element can be segmented into a plurality of ordered query data segments, and the identification of the query data segments in the graph is executed in accordance with this order. According to a further embodiment, the query data element may describe a path in the graph. According to a further embodiment, the query data segment may feature a binary code, a superordinate data element, a subordinate data element, a node, a URL, a URI, a virtual folder and/or a file name. According to a further embodiment, at least part of the graph can be described by an XML document, a binary code, a graphical representation, a textual description, an ontological language, a formal model, a relational database and/or a graph description language. According to a further embodiment, the superordinate data element may correspond to a root data element in the context of a first comparison of the subordinate data element with the query data segment. According to a further embodiment, the query data segment, the query data element, the subordinate data element and/or the superordinate data element may feature at least one attribute.

According to another embodiment, an apparatus for searching in a memory-efficient manner for at least one query data element in a graph, in particular using the method as described above, may comprise: —a segmentation unit for segmenting the query data element into at least one query data segment; —an iteration unit for iteratively executing the following subsidiary steps for identifying the at least one query data segment in the graph: a) comparing a subordinate data element with a query data segment, wherein the subordinate data element is connected to a superordinate data element by means of exactly one edge in the graph; and b) storing the subordinate data element as a superordinate data element, if the subordinate data element features at least one query data segment; —a superordinate data element provision unit for providing the stored superordinate data element if the at least one query data segment is identified in the graph.

According to a further embodiment of the above apparatus, the apparatus may comprise a data memory for storing at least part of the graph. According to a further embodiment of the above apparatus, the apparatus may comprise a readout unit for reading out at least part of the graph from a remote data memory. According to a further embodiment of the above apparatus, the apparatus may comprise a first interface unit for receiving at least part of the graph, of the query data element, of the query data segment, of the superordinate data element and/or of the subordinate data element. According to a further embodiment of the above apparatus, the apparatus may comprise a second interface unit for providing at least part of the graph, of the query data element, of the query data segment, of the superordinate data element and/or of the subordinate data element. According to a further embodiment of the above apparatus, the first interface unit and the second interface unit can be available as a combined interface.

According to yet another embodiment, a computer program product may initiate the implementation of a method as described above.

According to yet another embodiment, a data memory may store a computer program product as described above.

BRIEF DESCRIPTION OF THE DRAWINGS

Further embodiments are the subject matter of the subclaims and of the exemplary embodiments described in the following. The invention is explained below with reference to exemplary implementations and with reference to the appended figures, in which:

In the FIGS. 1 to 6, identical or functionally identical elements are denoted by the same reference characters unless otherwise specified.

DETAILED DESCRIPTION

Figure 1:
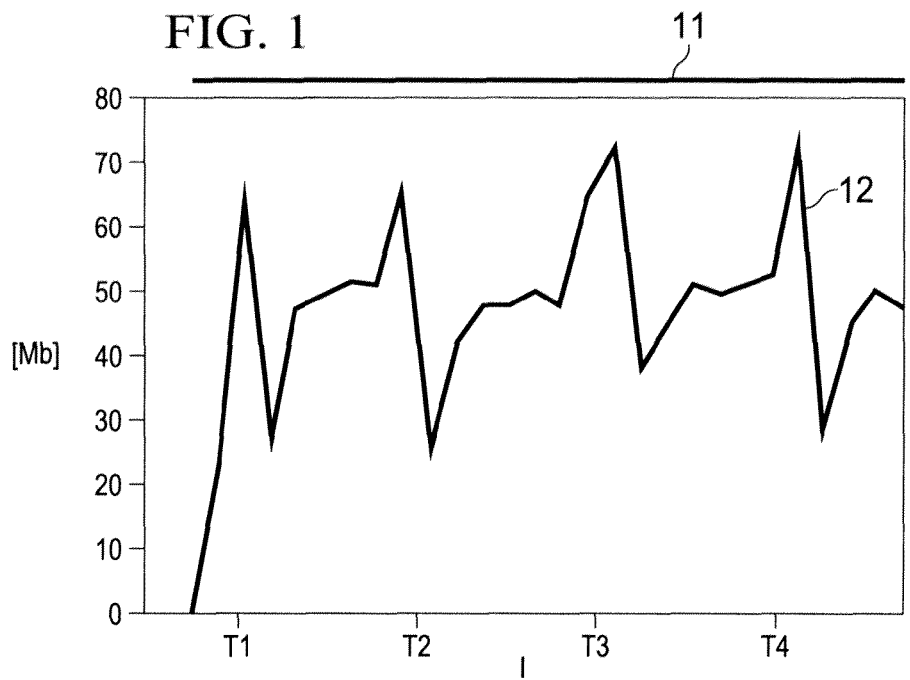
FIG. 1 shows a memory requirement diagram which compares a memory requirement in accordance with conventional methods and a memory requirement of a method for searching in a memory-efficient manner in accordance with various embodiments.

According to claim 1, a method is proposed for searching in a memory-efficient manner for at least one query data element in a graph. The method for searching in a memory-efficient manner features the following steps:

In a first method step, the query data element is segmented into at least one query data segment.

Subsidiary steps for identifying the at least one query data segment in the graph are then executed iteratively.

In a first subsidiary step, a subordinate data element is compared with a query data segment, wherein the subordinate data element is connected with a superordinate data element by means of exactly one edge in the graph.

In a second subsidiary step, the subordinate data element is stored as a superordinate data element if the subordinate data element features at least one query data segment.

After execution of the aforementioned subsidiary steps, the stored superordinate data element is provided if the at least one query data segment is identified in the graph.

A graph can be a data structure providing data elements that are connected by means of relationships. For example, it can be a tree structure which takes the form of nodes and edges. In this context, a tree structure provides a set of data elements which are represented by nodes. These data elements are arranged hierarchically by means of relationships, said relationships being represented by means of edges. The present graph can also feature cycles, i.e. when processing the nodes along the edges, it is possible to arrive back at an already processed node.

The graph also has a selection of data elements which can be designated as a root data element, superordinate data element, subordinate data element and/or query data element. In this context, a root data element is an individual data element of the graph, and can act as a superordinate data element when searching in a memory-efficient manner for the at least one query data element. In each case, a superordinate data element features an edge which connects the superordinate data element to a subordinate data element. Data elements which are in each case connected to a further data element by means of only one edge, act as subordinate data elements and can therefore be designated as leaf data elements.

A query data element is a data element that is to be identified in a graph that has been provided. In this context, the query data element might be contained in the graph, or it might not be contained in the graph, in which case a return value describing the absence of the query data element in the graph is output. For example, if the graph is processed as far as at least one leaf data element in accordance with the method for searching in a memory-efficient manner for at least one query data element, the query data element can be designated as not contained in the graph. This can be indicated by means of a boolean value and/or a corresponding error message, for example. It is also possible for the query data element to feature a plurality of query data segments, wherein all query data segments of the query data element must be identified in the graph. Failing a complete identification of all query data segments of the query data element, it is considered that the query data element is not contained in the graph. However, if all query data segments of the query data element are identified in the graph, the query data element is considered to be contained in the graph. In this context, it is also possible to output a corresponding source location of the query data element in the graph and/or a positive reply message.

A query data element can describe a path within a graph, for example. To this end, the query data element can specify a series of nodes which describe the path from a root data element to a query data element segment. The query data element therefore describes a path in the graph, and the query data segment describes in each case a node and/or an edge in the graph. For example, the graph consists of the nodes "E1", "E2" and "E3", which are arranged to form a path. The query data element can include the expression "E1/E2/E3", for example. A query data segment is "E1" in this context. A further query data segment can have the value "E2" or "E3", for example.

Furthermore, it is also possible for the query data element to describe a directory path, and for the graph to represent a directory structure. A query data segment can describe an individual directory, for example. Alternatively, it is also possible for a plurality of directories or a plurality of nodes to be combined to form a single query data segment. In the case of a graph, for example, the elements "E1" and "E2" can be combined to form a single query data segment "E1/E2". Segmentation of the query data element can be used to identify the individual query data segments. Predefined metrics can be used in this context, describing how the query data element is to be segmented into at least one query data segment.

In order to search for the at least one query data element in the graph, a comparison is made of a subordinate data element with a query data segment, wherein the subordinate data element is connected to a superordinate data element by means of a exactly one edge in the graph.

The superordinate data element can correspond to a root data element in a first execution of this subsidiary step. If no root data element is shown in the stored data, this subsidiary step can comprise further subsidiary steps such as identifying a root data element in the graph, for example. The superordinate data element can be described as a data element "E1", for example. When the subordinate data element is compared with a query data segment, a check determines whether the query data segment is at least partially contained or included in the subordinate data element. In this context, it can also be advantageous to check whether the query data segment is fully contained in the subordinate data element.

If the query data segment is contained in the subordinate data element, this subordinate data element is stored as a superordinate data element. This means that further method steps refer to this new superordinate data element, which acted as a subordinate data element in preceding method steps.

Superordinate data elements are connected to subordinate data elements, which are compared with a query data segment, by means of exactly one edge. It is therefore unnecessary to load a multiplicity of subordinate data elements or sub-trees of the graph into the memory. If a subordinate data element which features a query data segment is identified, storage of the subordinate data element only takes place, in a subsequent iterative comparison of the subordinate data element with a query data segment, if the query data segment is actually also identified.

If the query data segment is not identified in the subordinate data element, the subordinate data element is not stored as a superordinate data element, but a new comparison of a further subordinate data element with a query data is performed. No storage of further subordinate data elements takes place in this context. If it is established that a subordinate data element does not feature a query data segment, this subordinate data element can be removed from the memory immediately after the comparison of this subordinate data element with the query data segment.

If a path "E1/E2/E3" is sought in a graph, for example, identification of the root data element "E1" takes place in a first method step. The root data element "E1" now represents a superordinate data element "E1". A comparison of a subordinate data element "Ex" with a query data segment "E2" takes place, and it is established that this subordinate data element "Ex" does not match the query data segment "E2". Therefore the subordinate data element "Ex" is not stored as a superordinate data element. In a further execution of the comparison of a further subordinate data element "E2" with a query data segment "E2", it is established that this subordinate data element "E2" matches the query data segment "E2". The subordinate data element "E2" is therefore stored as superordinate data element "E2". In a further execution of the comparison of a subordinate data element "E3" with a query data segment "E3", it is established that the subordinate data element "E3" of the superordinate data element "E2" matches the query data segment "E3". All query data segments "E1", "E2" and "E3" of the query data element "E1/E2/E3/" have therefore been identified.

The stored superordinate data element "E3" is therefore provided. Alternatively, it is also possible to output a positive reply message, e.g. the boolean value "true".

It is also possible for at least a selection of the data elements of the graph to feature further attributes. When providing the stored superordinate data element, it is therefore possible also to output further attributes of this superordinate data element.

In an embodiment of an aspect of the present invention, the storage of the subordinate data element as a superordinate data element is done in such a way that a superordinate data element that was stored previously is overwritten by the subordinate data element.

This offers the advantage that only required superordinate data elements are stored, and if superordinate data elements are no longer required, they are overwritten accordingly.

In a further embodiment, the storage of the subordinate data element as a superordinate data element is done in such a way that a previously stored superordinate data element is deleted from a memory and the subordinate data element is written to the memory.

This has the advantage that memory space is released as a result of deleting superordinate data elements that are no longer required.

In a further embodiment, the query data element is segmented into a plurality of ordered query data segments and the identification of the query data segments in the graph is executed in accordance with this order.

This offers the advantage that e.g. a path in a graph can be processed sequentially.

In a further embodiment, the query data element describes a path in the graph.

This offers the advantage that the graph can be searched using previously implemented algorithms which accept a path in a graph as an input value.

In a further embodiment of an aspect of the present invention, the query data segment features a binary code, a superordinate data element, a subordinate data element, a node, a URL, a URI, a virtual folder and/or a filename.

This offers the advantage that the query data segment can feature a plurality of data elements, and hence can be utilized in a multiplicity of application scenarios.

In a further embodiment of an aspect of the present invention, at least part of the graph is described by an XML document, a binary code, a graphical representation, a textual description, an ontological language, a formal model, a relational database and/or a graph description language.

This produces the advantage that the graph can be described in a multiplicity of representation forms. This additionally has the advantage that existing representations of graphs can be re-used.

In a further embodiment, in the case of a first comparison of the subordinate data element with the query data segment, the superordinate data element corresponds to a root data element.

This offers the advantage that paths which typically start with a root data element can be sought in the graph.

In a further embodiment, the query data segment, the query data element, the subordinate data element and/or the superordinate data element feature at least one attribute.

This offers the advantage that the data elements can feature further attributes, which are used e.g. when searching for and/or comparing the query data element. Furthermore, supplementary information which is associated with the data elements can also be output.

Various embodiments additionally provide an apparatus for searching in a memory-efficient manner for at least one query data element in a graph, in particular using one of the methods cited above.

The apparatus features a segmentation unit for segmenting the query data element into at least one query data segment.

The apparatus also features an iteration unit for iteratively executing the following subsidiary steps for identifying the at least one query data segment:

a) comparing a subordinate data element with a query data segment, wherein the subordinate data element is connected to a superordinate data element by means of exactly one edge in the graph; and b) storing the subordinate data element as a superordinate data element if the subordinate data element features at least one query data segment.

The apparatus also features a superordinate data element provision unit for providing the stored superordinate data element if at least one query data segment is identified in the graph.

In an embodiment of an aspect of the present invention, the apparatus features a data memory for storing at least part of the graph.

This offers the advantage that the apparatus provides e.g. a volatile data memory for storing intermediate results, e.g. a superordinate data element.

In a further embodiment, the apparatus comprises a readout unit for reading out at least part of the graph from a remote data memory.

This has the advantage that at least part of the graph can be read out from a remote data memory via a data connection. For example, the apparatus can be a client which reads out at least part of the graph from a remote data server.

In a further embodiment, the apparatus features a first interface unit for receiving at least part of the graph, of the query data element, of the query data segment, of the superordinate data element and/or of the subordinate data element.

This offers the advantage that a previously implemented interface can be used for receiving the data elements.

In a further embodiment, the apparatus features a second interface unit for providing at least part of the graph, of the query data element, of the query data segment, of the superordinate data element and/or of the subordinate data element.

This offers the advantage that a previously implemented interface can be used for providing the data elements.

In a further embodiment, the first interface corresponds to the second interface, or the first interface and the second interface are available as a combined interface.

This has the advantage that a single interface unit can be used for receiving and providing data elements.

The various embodiments additionally provide a computer program product which initiates the implementation of the aforementioned methods, and a data memory for storing a computer program product.

Provision is therefore made for a method and an apparatus for searching in a memory-efficient manner for at least one query data element in a graph.

FIG. 1 shows a memory requirement diagram, in which a memory requirement is represented on the y-axis for a specific time which is entered on the x-axis in each case. When seeking at least one query data element in accordance with a conventional method, in which e.g. the entire graph is loaded into a data memory, there is a constant memory requirement of more than 80 MB during the search. This is indicated by the constant memory curve 11 in the present FIG. 1.

When executing the memory-efficient search for at least one query data element in the graph in accordance with the method according to various embodiments, a maximal memory requirement of 73 MB is reached at a time point T4. Further temporary maxima in terms of the memory requirement are reached at time points T1, T2 and T3. Since the execution of the memory-efficient search for at least one query data element in the graph according to an aspect of the present invention involves a deletion of at least one data element, or stored data elements are deleted from the memory, there is a reduced memory requirement in each case after reaching the peak values at the time points T1, T2, T3 and T4. An exemplary memory requirement profile as per the method for searching in a memory-efficient manner for at least one query data element in accordance with an aspect of the present invention is shown by the memory requirement curve 12.

Use of the memory-efficient search for at least one query data element in the graph is particularly advantageous in the case of terminals having limited memory. In the present exemplary embodiment, a mobile terminal which executes the method for searching in a memory-efficient manner has a memory space of 75 MB. It follows that a search which is carried out in a graph as per conventional methods and requires more than 80 MB cannot be executed on this terminal. In the present exemplary embodiment, since the maximal memory requirement of the method for searching in a memory-efficient manner for at least one query data element in accordance with an aspect of the present invention has a maximal memory requirement of only 73 MB at the time point T4, the query data element can be executed on this terminal without memory problems arising. A memory overflow, also known as a buffer overflow, of a memory in the mobile terminal is therefore avoided.

Figure 2:
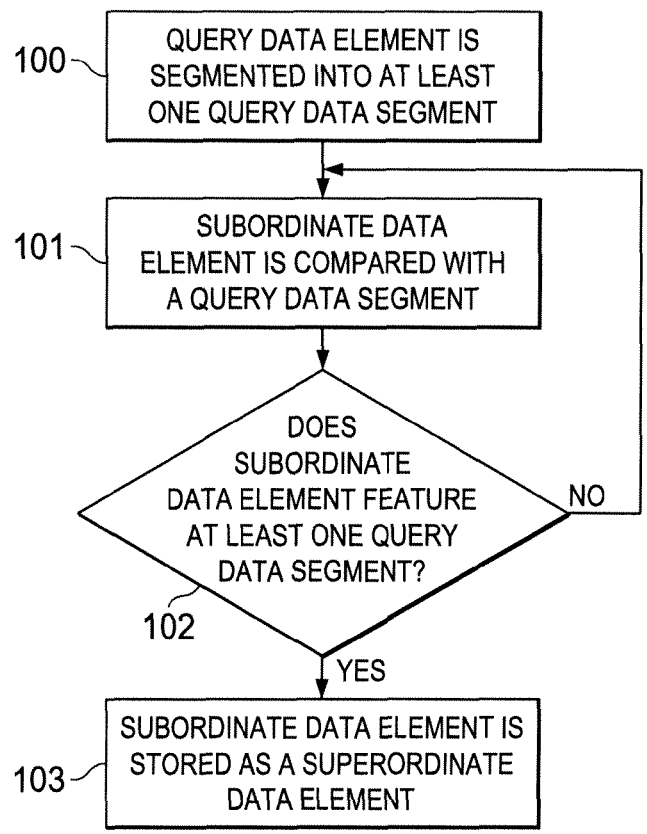
FIG. 2 shows a flow diagram of a method for searching in a memory-efficient manner for at least one query data element in accordance with an embodiment.

FIG. 2 shows a flow diagram of a method for searching in a memory-efficient manner for at least one query data element in a graph in accordance with an aspect of the present invention. The method comprises the following steps:

In a first method step 100, segmentation of the query data element into at least one query data segment takes place.

In a second method step 101, iterative execution of the following subsidiary steps for identifying the at least one query data segment in the graph takes place:
a) comparing a subordinate data element with a query data segment, wherein the subordinate data element is connected with a superordinate data element by means of exactly one edge in the graph; and
b) storing the subordinate data element as a superordinate data element if the subordinate data element features at least one query data segment.

In a final method step 102, provision of the stored superordinate data element takes place if the at least one query data segment was identified in the graph.

The described method steps can be executed iteratively and/or in a different sequence.

Figure 3:
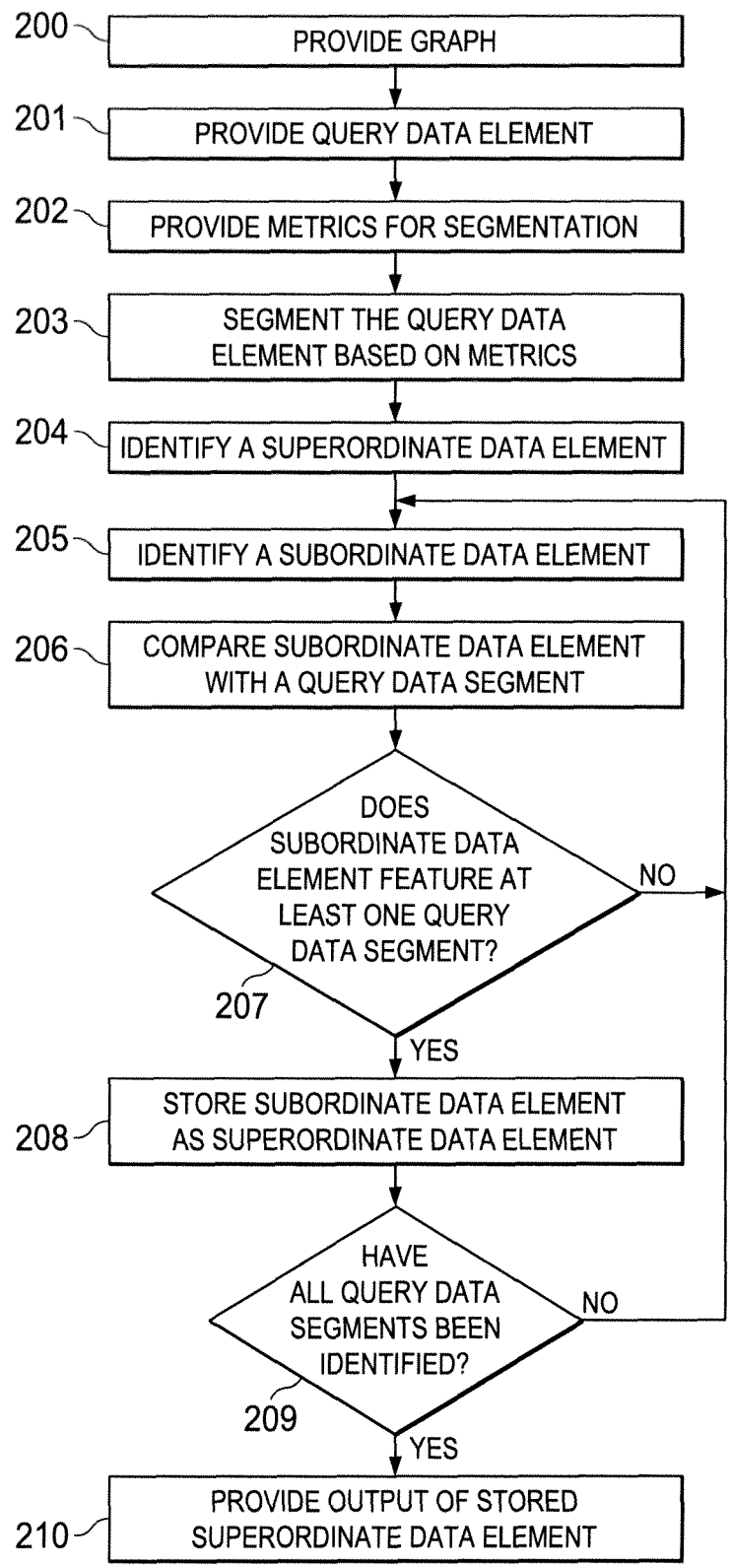
FIG. 3 shows a detailed flow diagram of a method for searching in a memory-efficient manner for at least one query data element in accordance with an embodiment.

FIG. 3 shows a detailed flow diagram of a method for searching in a memory-efficient manner for at least one query data element in a graph in accordance with an embodiment and features the following method steps:

In a first method step 200, provision of the graph takes place. As part of this activity, for example, a mobile terminal is notified that a graph is available for further processing, e.g. for searching. The provision of the graph can be done by means of specifying a URL. The graph can also be a representation of the graph, e.g. an XML file. Provision of an XML file therefore takes place in the method step 200. The provision of the graph can comprise a plurality of subsidiary steps, e.g. the transmission of the graph to the mobile terminal.

In a method step 201 following thereupon, provision of a query data element takes place. The query data element can feature e.g. a path in the graph that was provided in method step 200. However, the query data element can also describe a single node element of the graph. If the nodes of the graph feature further attributes, the query data element can refer to these further attributes. Further attributes of the data elements can describe e.g. a validity of the relevant data element, the query data element being compared only with those data elements that are valid according to a specification of the query data element.

In further method steps, segmentation of the query data element takes place, metrics being provided for this purpose in a further method step 202, describing how the query data element is to be divided into at least one query data segment. The metrics provided in the method step 202 describe, for example, that individual query data segments in the query data element are separated in each case by a solidus.

In a method step 203 following thereupon, segmentation of the query data element into at least one query data segment as per the metrics provided in method step 202 can take place. The segmentation can comprise further subsidiary steps, e.g. the parsing of the query data element. In this context, it is possible to generate a new query data segment on the basis of e.g. each source location of a solidus in the query data element. Segmentation of the query data element into the individual query data segments therefore takes place in the method step 203. This can be executed in a specific sequence, which must be adhered to when identifying the query data segments in the graph. This is necessary in particular if the query data element is a path which describes an ordered set of nodes within the graph.

In a method step 204 following thereupon, identification of a superordinate data element takes place. A superordinate data element can be e.g. a root element of the graph. If the graph does not have an established root data element, a superordinate data element is identified in further subsidiary steps. As part of this activity, further metrics such as e.g. a centrality of a node can be applied.

In a method step 205 following thereupon, identification of a subordinate data element take place, wherein the subordinate data element is connected to a superordinate data element by means of exactly one edge in the graph. An edge which connects the superordinate data element and the subordinate data element is therefore identified in the method step 205.

In the method step 206, the identified subordinate data element is compared with at least one part of the query data element or at least one query data segment. If the subordinate data element does not feature the query data segment, provision is made for branching back into the method step 205. Identification of a further subordinate data element therefore takes place in the method step 205. The method steps 205 and 206 are iterated until a comparison in the method step 206 identifies a subordinate data element which features at least one query data segment. Alternatively, it is also possible to define a termination criterion which prevents an endless loop.

If a subordinate data element featuring the at least one query data segment is identified in the method step 206, storage of the subordinate data element as a superordinate data takes place in a method step 207.

Since at least one query data segment has now been identified in the graph, the method step 208 checks whether all query data segments (or the query data element) have been identified in the graph. If the query data element has not yet been fully identified, provision is made for branching back to the method step 205 again. Identification of a further subordinate data element relating to the new superordinate data element therefore takes place again. However, if it is established in the method step 208 that the query data element or all query data segments have been identified, output of the stored superordinate data element is initiated in a method step 209 following thereupon. Alternatively, a correspondingly positive reply message can be output.

In a further exemplary embodiment, it is possible to define termination criteria which specify e.g. that the query data element is not contained in the graph if a leaf data element is reached.

The described method steps can be executed iteratively and/or in a different sequence.

Figure 4:
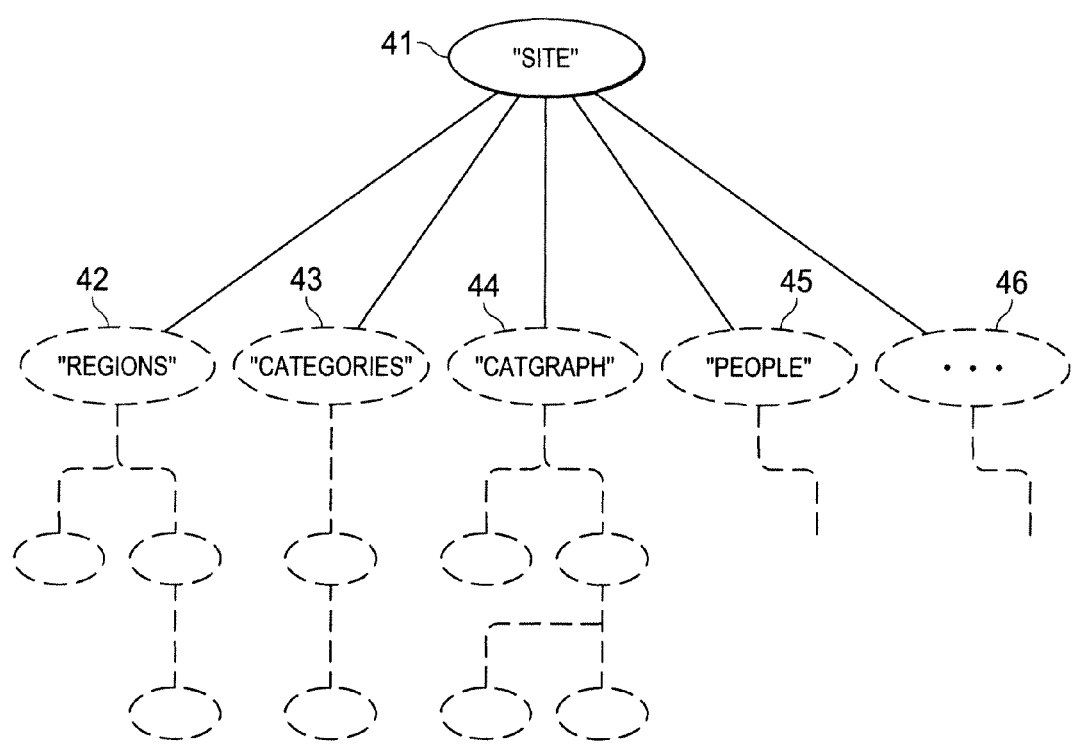
FIG. 4 shows a tree diagram of an encoded document in accordance with a method for searching in a memory-efficient manner for at least one query data element in accordance with an embodiment.

FIG. 4 shows a graph which is intended to explain a search for at least one query data element in accordance with a method for searching in a memory-efficient manner for at least one query data element in a graph according to an aspect of the present invention. There follows a brief overview of the character strings which designate the nodes that are illustrated.

| Character strings for the nodes in FIG. 4 | |
|---|---|
| 41 | ""site" |
| 42 | "regions" |
| 43 | "categories" |
| 44 | "catgraph" |
| 45 | "people" |
| 46 | ... |

The graph which is illustrated in FIG. 4 has a root data element 41 "site". The graph which is represented in FIG. 4 also has subordinate data elements 42, 43, 44, 45 and 46. A query data element in accordance with a search specification language XPath is exemplified in the expression "/site[1]/people[1]/person[2]".

This expression or query data element comprises the three query data segments "site[1]", "people[1]" and "person[2]". The query data segments can also be referred to as Xpath steps. The described query data element relates to a path within the graph, along the nodes "site", "people" and a further node "person", which is not shown in the present figure. In a similar manner to the representation of the query data element, the creation of an indexing mechanism takes place in accordance with the method for searching in a memory-efficient manner according to an aspect of the present invention.

In this context, instead of representing the query data segments as a character sequence, the encoding of the query data element is implemented by means of compact identification elements. For example, part of the query data element "/site (1)/people(1)" can be represented as a compact identification element of 233 bytes. An offset of 233 bytes is therefore defined, specifying the memory requirement of the query data element "/site[1]/people[1]". When addressing the query data element "people", the offset of 233 bytes is therefore bypassed in accordance with the method for searching in a memory-efficient manner according to an aspect of the present invention. As a result, only a relevant part of the graph is held in the memory, without including data elements that are no longer required.

Figure 5:
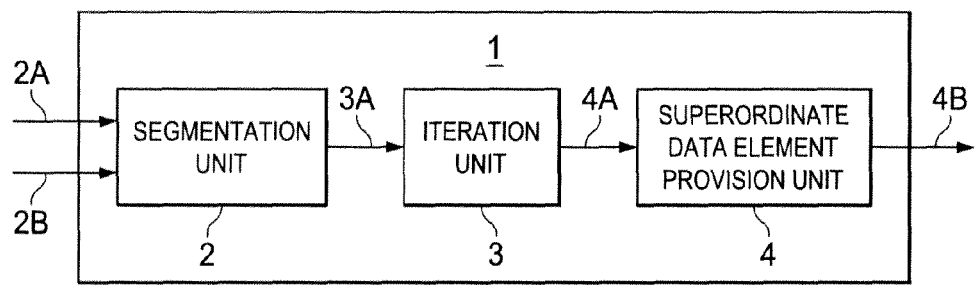
FIG. 5 shows a block diagram of an apparatus for searching in a memory-efficient manner for at least one query data element in accordance with an embodiment.

FIG. 5 describes a block diagram of an apparatus 1 for searching in a memory-efficient manner for at least one query data element 2B in a graph 2A. The graph 2A can be stored in a memory or received via a line and/or a network. The apparatus 1 features a segmentation unit 2 for segmenting the query data element 2B into at least one query data segment 3A.

The apparatus 1 additionally features an iteration unit 3 for iteratively executing the following subsidiary steps for the identification of the at least one query data segment 3A in the graph 2A:
a) comparing a subordinate data element with a query data segment 3A, wherein the data element is connected to a superordinate data element 4A by means of exactly one edge in the graph 2A; and
b) storing the subordinate data element as a superordinate data element 4A if the subordinate data element features at least one query data segment 3A.

The apparatus 1 additionally features a superordinate data element provision unit 4 for providing the stored superordinate data element 4B if the at least one query data segment 3A was identified in the graph.

Figure 6:
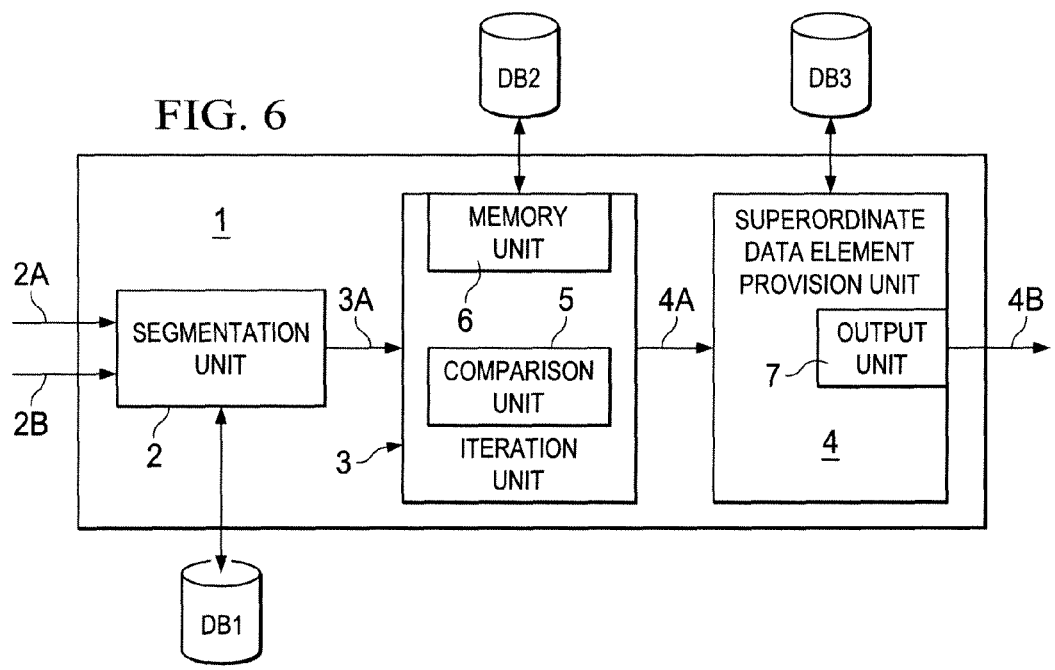
FIG. 6 shows a detailed block diagram of an apparatus for searching in a memory-efficient manner for at least one query data element in accordance with an embodiment.

FIG. 6 shows a detailed block diagram of an apparatus 1 for searching in a memory-efficient manner according to an aspect of the present invention and differs from the apparatus shown in FIG. 5 as follows:

In the present exemplary embodiment, the segmentation unit 2 communicates with a first data memory DB1. The data memory DB1 contains metrics which give instructions concerning how the query data element 2B is to be segmented into at least one query data segment 3A. In addition, the iteration unit features a comparison unit 5 which compares the subordinate data element with the query data segment 3A. The comparison unit 5 is moreover suitable for parsing e.g. an XML document. If the subordinate data element features at least one query data segment 3A, a memory unit 6 initiates storage of the subordinate data element as a superordinate data element 4A in a further data memory DB2.

The superordinate data element provision unit 4 provides the superordinate data element 4B, this being implemented by means of an output unit 7. In this context, the output unit 7 is suitable for formatting the superordinate data element 4B in a suitable representation. The output unit 7 can be e.g. a screen or a printer which is suitable for outputting the stored superordinate data element 4B. In order to achieve this, the superordinate data element provision unit 4 can access a further data memory DB3 which provides e.g. configurations of the output unit 7. For example, the data memory DB3 provides a printer configuration.

The apparatus 1, the segmentation unit 2, the iteration unit 3, the superordinate data element provision unit 4, the comparison unit 5 and the storage unit 6 can be a processor, microprocessor, computer, computer system, central processing unit, arithmetic-logic unit and/or a switching circuit.

The described data memory, in particular the data memory DB1, DB2 and/or DB3 can comprise any type of memory, e.g. hard disk, flash disk, USB stick, floppy disk, diskette, CD, DVD, Blu-ray disk, magnetic tape and/or exchangeable data medium.

What is claimed is:

1. A method for searching in a memory-efficient manner for a query data element in a graph comprising:
receiving or accessing the graph, which comprises a data structure including data elements arranged according to relationships between particular data elements,
segmenting the query data element into multiple query data segments including at least a first query data segment and a second query data segment, using predefined segmenting metrics;
after segmenting the query data element using the predefined segmenting metrics, identifying the multiple query data segments in the graph, which comprises subordinate data elements and superordinate data elements, by an iterative process including:
identifying a first one of the multiple data segments in the graph by:
a) determining whether or not the first query data segment is present in the graph by comparing each of a plurality of existing subordinate data elements of the graph with the first query data segment, wherein each subordinate data element is connected to a superordinate data element by exactly one edge in the graph;
b) storing a particular subordinate data element as a new superordinate data element in response to determining that the particular subordinate data element features the first query data segment; and
treating the particular subordinate data element, stored as a new superordinate data element, as a superordinate data element for identifying a second one of the multiple query data segments in the graph, such that identifying the second query data segment includes comparing existing subordinate data elements of the new superordinate data element with the second query data segment.

2. The method according to claim 1, wherein the storage of the particular subordinate data element as a superordinate data element is executed in such a way that a previously stored superordinate data element is overwritten by the particular subordinate data element.

3. The method according to claim 1, wherein the storage of the particular subordinate data element as a superordinate data element is executed in such a way that a previously stored superordinate data element is deleted from a memory and the particular subordinate data element is written into the memory.

4. The method according to claim 1, wherein the query data element is segmented into a plurality of ordered query data segments, and the identification of the query data segments in the graph is executed in accordance with an order of the multiple query data segments.

5. The method according to claim 1, wherein the query data element describes a path in the graph.

6. The method according to claim 1, wherein the query data segment features a binary code, a superordinate data element, a subordinate data element, a node, a URL, a URI, a virtual folder and/or a file name.

7. The method according to claim 1, wherein at least part of the graph is described by an XML document, a binary code, a graphical representation, a textual description, an ontological language, a formal model, a relational database and/or a graph description language.

8. The method according to claim 1, wherein the superordinate data element corresponds to a root data element in the context of a first comparison of the subordinate data element with the query data segment.

9. The method according to claim 1, wherein at least one of the query data segment, the query data element, the subordinate data element and the superordinate data element comprise at least one attribute.

10. The method according to claim 1, wherein the method is used in a mobile terminal.

11. An apparatus for searching in a memory-efficient manner for a query data element in a graph comprising:
 a segmentation unit for:
  receiving or accessing the graph, which comprises a data structure including data elements arranged according to relationships between particular data elements, and
  segmenting the query data element into multiple query data segments including at least a first query data segment and a second query data segment, using predefined segmenting metrics;
 an iteration unit for, after segmenting the query data element using the predefined segmenting metrics, identifying the multiple query data segments in the graph, which comprises subordinate data elements and superordinate data elements, by an iterative process including:
  identifying a first one of the multiple query data segments in the graph by:
   a) determining whether or not the first query data segment is present in the graph by comparing each of a plurality of existing subordinate data elements of the graph with the first query data segment, wherein each subordinate data element is connected to a superordinate data element by exactly one edge in the graph;
   b) storing a particular subordinate data element as a new superordinate data element in response to determining that the particular subordinate data element features the first query data segment; and
  treating the particular subordinate data element, which was stored as a new superordinate data element, as a superordinate data element for identifying a second one of the multiple query data segments in the graph, such identifying the second query data segment includes comparing existing subordinate data elements of the new superordinate data element with the second query data segment.

12. The apparatus according to claim 11, comprising a data memory for storing at least part of the graph.

13. The apparatus according to claim 11, comprising a readout unit for reading out at least part of the graph from a remote data memory.

14. The apparatus according to claim 12, comprising a first interface unit for receiving at least part of at least one of the graph, of the query data element, of the query data segment, of the superordinate data element and of the subordinate data element.

15. The apparatus according to claim 12, comprising a second interface unit for providing at least part of at least one of the graph, of the query data element, of the query data segment, of the superordinate data element and of the subordinate data element.

16. The apparatus according to claim 15, wherein the first interface unit and the second interface unit are available as a combined interface.

17. A computer program product comprising a non-transitory data memory storing instructions which when executed on a computer perform a method for searching in a memory-efficient manner for a query data element in a graph comprising:
 receiving or accessing the graph, which comprises a data structure including data elements arranged according to relationships between particular data elements,
 segmenting the query data element into multiple query data segments including at least a first query data segment and a second query data segment, using predefined segmenting metrics;
 after segmenting the query data element using the predefined segmenting metrics, identifying the multiple query data segments in the graph, which comprises subordinate data elements and superordinate data elements, by an iterative process including:
  identifying a first one of the multiple query data segments in the graph by:
   a) determining whether or not the first query data segment is present in the graph by comparing each of a plurality of existing subordinate data elements of the graph with the first query data segment, wherein each subordinate data element is connected to a superordinate data element by exactly one edge in the graph;
   b) storing a particular subordinate data element as a new superordinate data element in response to determining that the particular subordinate data element features the first query data segment; and
  treating the particular subordinate data element which was stored as a new superordinate data element, as a superordinate data element for identifying a second one of the multiple query data segments in the graph, such identifying the second query data segment includes comparing existing subordinate data elements of the new superordinate data element with the second query data segment.

18. The computer program product according to claim 17, wherein the storage of the particular subordinate data element as a superordinate data element is executed in such a way that a previously stored superordinate data element is overwritten by the particular subordinate data element.

19. The computer program product according to claim 17, wherein the storage of the particular subordinate data element as a superordinate data element is executed in such a way that a previously stored superordinate data element is deleted from a memory and the particular subordinate data element is written into the memory.

20. The computer program product according to claim 17, wherein the query data element is segmented into a plurality of ordered query data segments, and the identification of the query data segments in the graph is executed in accordance with a order of the multiple query data segments.

\* \* \* \* \*